Figure 1:
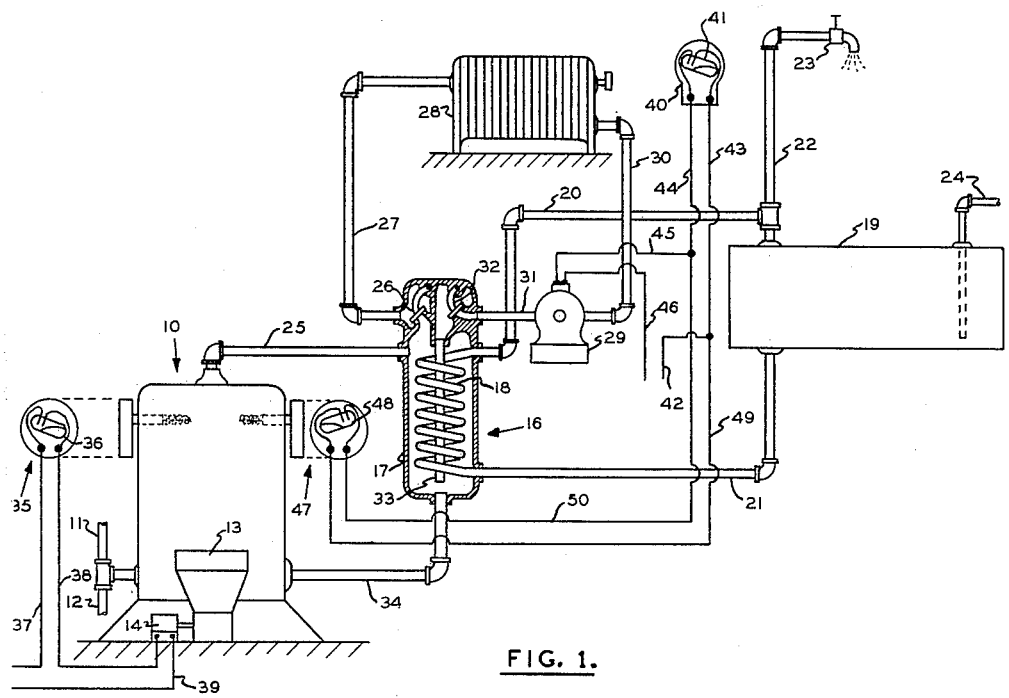

May 23, 1939.  W. R. MILLER  2,159,284

DOMESTIC HEATING AND HOT WATER SUPPLY SYSTEM

Filed Dec. 4, 1933

Inventor

WAYLAND R. MILLER

By George H Fisher

Attorney

Patented May 23, 1939

2,159,284

UNITED STATES PATENT OFFICE 2,159,284

DOMESTIC HEATING AND HOT WATER SUPPLY SYSTEM

Wayland R. Miller, Chicago, Ill., assignor to Minneapolis-Honeywell Regulator Company, Minneapolis, Minn., a corporation of Delaware Application December 4, 1933, Serial No. 700,787

14 Claims. (Cl. 237—19)

The present invention relates to the art of automatic heating and particularly to that phase of automatic heating wherein a single heating device such as a hot water boiler is utilized for heating a space or dwelling at such times as there is a demand for supplying heat thereto, as during the winter, and for heating a supply of hot water at all times irrespective of whether or not the space or dwelling is being supplied with heat.

One of the objects of the present invention is the provision of a control system for a single heating device for operating the same to provide a supply of hot water at all times and to permit the transmission of heat to the space or dwelling only when heat is desired therein, together with a safety device arranged to allow heat to be supplied to the space or dwelling even though heat is not needed therein if a heat condition of the heater should become excessive.

More particularly, an object of the invention comprises the provision of a control system for a heater for heating a fluid medium and a supply of hot water, in which the temperature of the fluid medium is normally maintained at or above a predetermined minimum, providing means for allowing flow of the fluid medium to the space or dwelling to be heated when the temperature thereof is below the desired point and providing means responsive to the temperature of the heating fluid for operating said last-named means in such manner as to permit flow of the fluid medium to the space or dwelling even though the temperature thereof is at or above the desired point in the event the temperature of the heating fluid becomes excessive.

More specifically, the invention has for an object the provision of an electrical control system for an electrically operated heating device for heating a fluid medium and a supply of hot water whereby the electrically operated heating device is operated sufficiently often at the command of a thermostatic switching mechanism responsive to the temperature of the fluid medium to constantly maintain the fluid medium at or above the temperature necessary to insure a ready supply of hot water for domestic uses, providing an electrically operated circulation controlling means for controlling the flow of the fluid medium to a space to be heated, a space temperature responsive thermostatic switch being in control of the means for controlling the circulation of the heating fluid to the space or dwelling, together with a heating fluid temperature responsive switching means for operating the circulating means irrespective of the condition of the space temperature responsive switching means if the temperature of the heating fluid becomes excessive. The circulation controlling means may take the form of a valve, a pump or any other suitable device for controlling the flow of heating fluid to the space or dwelling. Likewise, the heater may be hot water, warm air, or any other type of heating device and may be fired by oil, gas or coal and particularly by a stoker when fired by coal.

The arrangement may be such that the electrically operated heating means is controlled entirely by the temperature of the heating fluid or it may be controlled conjointly by the temperature of the heating fluid and by the space temperature responsive switching means.

A further object of the invention is the provision of a single heating device for heating a space or dwelling and for maintaining a constant supply of domestic hot water in which the necessity for a domestic hot water storage tank is eliminated by placing a water heater directly within the main heater, the water heater being connected directly to the domestic hot water supply system. This is preferably accomplished by placing a pipe coil within the main heater at some point so as to be readily heated thereby and maintained at or above some predetermined minimum temperature.

It will be appreciated that for certain types of heating systems and for certain positions of the water heater within the main heater, the temperature of the water delivered to the domestic hot water system may become excessive so as to present a danger of burning or scalding to the users of such water and the invention therefore contemplates the inclusion of a thermostatic mixing valve by means of which a variable quantity of cold water is automatically mixed with the water delivered by the water heater so that the temperature of the water in the domestic supply can never rise above a predetermined maximum temperature.

A further object of the invention therefore comprises the direct heating of a supply of domestic hot water by a heating device for heating a space, together with automatic means for mixing a variable quantity of cold water with the domestic hot water to prevent the supply of domestic hot water from reaching too high a temperature.

A further object of the invention is the provision of a dual heating system of the class above described in which thermostatic means responsive to the temperature of the heating fluid prevents the circulation of heating fluid to the space or dwelling to be heated in the event the temperature of the heating fluid is reduced to such a value that it is incapable of supplying sufficient heat to the domestic hot water system to maintain the temperature of the domestic water above a desired minimum.

Such a condition arises particularly in the morning when there is a heavy demand for domestic hot water and when the heating system is being operated at its maximum capacity by reason of the space thermostat setting having been changed from a low night setting to a higher day setting and particularly in those systems wherein the flow of heating fluid to the space or dwelling is controlled by a circulator whereby the circulation of the heating fluid is relatively fast.

Other objects of the invention will be found in the following description, the accompanying drawing and the appended claims.

Figure 2:
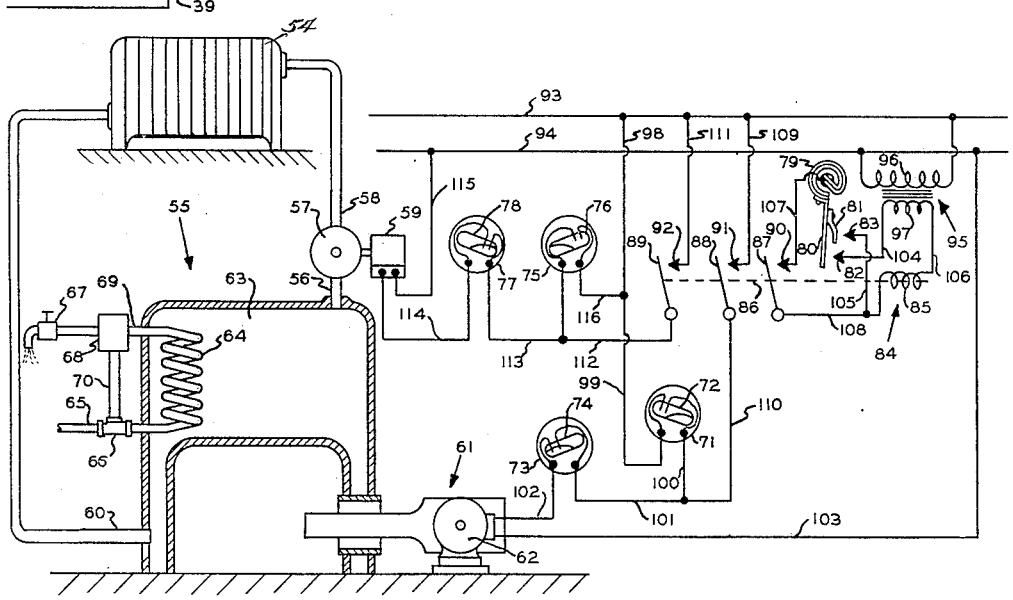

In the drawing,

Fig. 1 is a diagrammatic showing of certain phases of the invention applied to a dual heating system of the type utilizing a hot water storage tank and, Fig. 2 is a diagrammatic illustration of a system embodying substantially all of the features of the present invention including the elimination of a hot water storage tank.

Referring first to Fig. 1 of the drawing, a hot water boiler indicated generally at 10 is provided with the usual boiler water supply pipe 11 by which the boiler may be filled with water, and the usual drain pipe 12 by which the boiler may be drained when desired. The boiler is shown as being heated by a stoker 13 having the usual stoker motor 14.

A heat exchanger type of water heater indicated generally at 16 comprises a casing 17 having a pipe coil 18 therein which communicates with a hot water storage tank 19 of usual construction by means of pipes 20 and 21. The storage tank 19 has a hot water outlet pipe 22 which is connected to a faucet 23 of a domestic hot water supply system and is further provided with an inlet pipe 24 by means of which cold water is admitted to the hot water storage tank 19 to maintain the same full. The hot water heater 16 is connected to the outlet of the hot water boiler 10 by a main 25. Hot water may flow from the hot water boiler 10, through the main 25, past a gravity actuated check-valve 26, to one or more risers 27 which, in turn, supply one or more radiators 28 located in the space or dwelling to be heated. The outlets of the radiators 28 are connected to the intake of an electrically operated pump 29 by pipe means 30. The outlet of the electrically operated pump 29 communicates with the interior of hot water heater 16 by means of a pipe 31, flow of water from the pump 29 to the interior of the hot water heater 16 being additionally controlled by a second gravity operated check-valve 32.

All of the water returned from the heating system flows through a pipe 33 which is located within the hot water heater 16 and passes downwardly through the axis of the pipe coil 18. Some of the hot water from the main 25 may flow directly downwardly through the water heater 16 and around and over the pipe coil 18 so as to heat the water therein and all of this water together with the return water from the radiating system is returned from the water heater 16 to the boiler 10 by means of a return pipe 34.

The hot water boiler 10 is provided with a thermostatic control generally indicated at 35 of well-known construction which includes a mercury switch 36 that closes at about 140° F. on boiler temperature fall, the switch 36 being closed for all temperatures below this value and being opened for all temperatures above this value. This thermostatic switch 36 is herein shown in the open position indicating that the temperature of the boiler water is above 140° F. and is connected to the stoker motor 14 of the stoker 13 by wires 37, 38 and 39. Whenever the boiler water temperature falls to or below 140° F. the mercury switch 36 closes to complete a circuit to the stoker motor 14 from the power line by way of wires 37 and 38 and back to the power line by wire 39 all in a manner well-known in the art. In this manner, the boiler water is normally maintained at or above 140° F. at all times. Some of this water continually flows through the main 25 down through the water heater 16 and over the pipe coil 18 and returns to the boiler by return pipe 34. As a result, the domestic water in pipe coil 18 is continually being heated and this hot water flows to hot water storage tank 19 by means of pipe 20 and is replaced by cooler water by means of pipe 21 whereby under normal conditions the hot water storage tank 19 is maintained substantially full of hot water at all times. This hot water may be drawn off as needed by means of the faucet 23 and, as it is drawn off, it is replaced by a new supply of cold water through pipe 24.

The gravity operated check-valves 26 and 32 prevent the flow of boiler water from the main 25 to the riser 27 so that normally no heating fluid flows to the radiators 28. A thermostatic switch 40 located in the space to be heated includes a mercury switch 41 which closes whenever the space or room temperature falls to about 70° F. and controls a circuit for the electric pump 29. This circuit includes line wire 42, a wire 43, switch 41, a wire 44, a wire 45, the electrically operated pump 29, and line wire 46. Electrically operated pump 29 is therefore energized whenever the temperature of the space falls below the desired value. Energization of electrically operated pump 29 creates a pressure sufficiently high to open the gravity operated check-valves 26 and 32 whereupon boiler water is circulated from the main 25, through check-valve 26, through riser 27 to the radiators 28, and returns by way of pipe 30, electric pump 29, pipe 31, through the check-valve 32, pipe 33, and return line 34 to the boiler 10. In this manner, boiler water is circulated to the radiating system in the space or dwelling whenever the temperature thereof falls below the desired value.

In some instances and particularly after a prolonged call for heat by the thermostatic switch 41, the temperature of the boiler will be relatively high and when the thermostatic switch 41 opens its circuit to deenergize electric pump 29, whereupon further flow of boiler water to the radiating system is prevented, the heat contained within the boiler, fire brick, etc., will cause the boiler water temperature to continue to rise. This is particularly true when the boiler is heated by a stoker. In some cases, the boiler water temperature will rise to such an extent that steam is produced. This is a very dangerous condition which should be obviated even at the expense of overheating the space or dwelling. The present invention therefore includes a second thermostatic switching mechanism responsive to boiler water temperature which is indicated at 47 and includes a mercury switch 48 arranged to close upon a rise in the boiler water temperature to some excessive temperature value, say 210° F. This switch 48 controls electric pump 29 by a circuit which includes line wire 42, a wire 49, switch 48, a wire 50, a wire 45, electric pump 29, and line wire 46. Therefore, if the temperature of the boiler water becomes excessive for any reason whatsoever, the pump 29 is energized to circulate boiler water to the radiating system irrespective of the condition of the space temperature responsive switch 41. In this manner, the switch 48 acts as a safety device to prevent an excessive heat condition within the boiler 10 even though in so doing some of the closeness of the space temperature control system is sacrificed.

Turning now to Fig. 2, a heating device again in the form of a hot water boiler is generally indicated at 55. The hot water boiler 55 is provided with a main 56 which communicates with a circulation controlling device again shown in the form of an electrically operated pump 57 which communicates with a riser 58 for supplying boiler water to the radiating system schematically indicated by a radiator 54. The pump 57 is operated by an electric motor 59. The boiler 55 is also provided with the usual return line 60 by which the boiler water circulated to the radiating system is returned to the boiler. With certain types of pumps, it may be found desirable to place a check valve in the main 58 and in the return line 60. The hot water boiler 55 is herein shown as being fired by an electrically operated oil burner generally indicated at 61 which includes a burner motor 62.

Located directly in the hot water chamber 63 of boiler 55 is a pipe coil 64, one end of which communicates with a cold water supply pipe 65 through a T connection 66. The other end of pipe coil 64 communicates with a faucet 67 through a thermostatic mixing valve 68 of any well-known construction and a pipe 69. The thermostatic mixing valve 68 is connected to the T connection 66 by a pipe 70.

Hot water boiler 55 is provided with a thermostatic switching mechanism 71 which includes a mercury switch 72 that closes when the boiler water temperature falls to approximately 140° F. The boiler 55 is further provided with high limit control of usual construction indicated at 73 which includes a mercury switch 74 that moves to open circuit position upon rise in the boiler water temperature to approximately 180° F. The system of Fig. 2 further includes an overrun safety thermostatic switching means 75 which includes a mercury switch 76 that is operated by fluctuations in boiler water temperature and is arranged to move to closed circuit position if the boiler water temperature should rise to some excessive value such as 210° F. Another boiler water temperature responsive thermostatic switching mechanism is indicated at 77 and includes a mercury switch 78 which is moved to open circuit position if the temperature of the boiler water should fall to some undesired low point such as 130° F. The control system further includes a room thermostat 79 of well-known construction having blades 80 and 81 for sequentially engaging contacts 82 and 83 upon a decrease in the room temperature. The room thermostat controls a relay generally indicated at 84 which comprises a relay coil 85, an armature 86, switch arms 87, 88 and 89 and cooperating contacts 90, 91 and 92. High voltage electrical power is furnished by line wires 93 and 94 and low voltage power is supplied by a step down transformer 95 having a high voltage primary 96 and a low voltage secondary 97.

With the parts in the position shown, the room temperature is above the desired value, the boiler water temperature is above 140° F. but below 180° F. and the burner motor 62 is not in operation. The room or space to be heated and the boiler water will therefore cool. Assuming that the boiler water temperature falls to 140° F. before the room cools sufficiently to close the room thermostat contacts, the burner motor 62 will be energized by a circuit as follows: line 93, wire 98, wire 99, switch 72, wire 100, wire 101, high limit switch 74, wire 102, burner motor 62, and wire 103 to line 94. Operation of burner motor 62 will increase the temperature of the water in the boiler so as to move switch 72 to open position and deenergize burner motor 62. In this manner, the oil burner 61 is operated sufficiently often to normally maintain the temperature of the boiler water at or above 140° F. even when the room temperature is above the desired value. The boiler water therefore maintains the water in pipe coil 64 at or above 140° F. so that there is always a supply of hot water available at faucet 67.

Whenever the room temperature falls below the desired point so as to first bring blade 80 into engagement with contact 82 and then bring blade 81 into engagement with contact 83, relay coil 85 will be energized as follows: secondary 97, wire 104, contact 82, blade 80, blade 81, contact 83, wire 105, relay coil 85, and wire 106 to the other side of secondary 97. Energization of relay coil 85 attracts armature 86 whereby switch arms 87, 88 and 89 are moved into engagement with their respective contacts 90, 91 and 92. Engagement of switch arm 87 with contact 90 establishes the following holding circuit for relay coil 85 which is independent of blade 81 and contact 83 of the room thermostat: secondary 97, wire 104, contact 82, contact 80, wire 107, contact 90, switch arm 87, wire 108, relay coil 85 and wire 106 to the other side of secondary 97. Engagement of switch arm 88 with contact 91 energizes burner motor 62 irrespective of the condition of switch 72 by a circuit as follows: line 93, wire 109, contact 91, switch arm 88, wire 110, wire 101, high limit switch 74, wire 102, burner motor 62, and wire 103 to line 94. Engagement of switch arm 89 with contact 92 energizes pump motor 59 as follows: line 93, wire 111, contact 92, switch arm 89, wire 112, wire 113, switch 78, wire 114, pump motor 59 and wire 115 to line 94. In this manner, hot water is circulated to the radiators to heat the room and restore the room temperature and the oil burner 61 is operated to keep the boiler water heated. If, during operation of the oil burner at the command of the room thermostat, the boiler water temperature should reach some undesired high degree such as 180° F., high limit switch 74 will open and deenergize the burner motor 62 but pump motor 59 will remain energized.

When the room thermostat becomes satisfied and deenergizes relay coil 85 so as to move switch arms 87, 88 and 89 from engagement with contacts 90, 91 and 92, the burner motor 62 and pump motor 59 will both be deenergized. Further circulation of hot water to the radiators is therefore prevented. As explained in connection with Fig. 1, it sometimes happens that the residual heat in the furnace will be sufficient to cause the boiler water temperature to rise to some unsafe value such as 210° F. since all circulation of hot water to the radiators has been stopped by deenergization of pump motor 59. If this should happen, overrun safety switch 76 is moved to closed position and energizes pump motor 59 by a circuit as follows: line 93, wire 98, wire 116, switch 76, wire 113, switch 78, wire 114, pump motor 59 and wire 115 to line 94. The pump motor 59 will remain energized until such time as the boiler water temperature has decreased below 210° F. at which time safety overrun switch 76 will open to deenergize the pump motor 59.

Under certain conditions, and particularly where the boiler water is circulated to the radiators by means of a pump such as the pump 57, heat may be taken from the boiler water at such a high rate that the temperature thereof falls below 130° F. even though the burner motor 62 is operating continuously. Such a condition may arise during extremely cold weather or in the morning when the room thermostat setting is raised by the usual clock mechanism. In such an event, it is desirable to prevent the further circulation of boiler water to the radiators until such time as the boiler water temperature has increased to about 130° F., thereby insuring that the pipe coil 64 will always be heated sufficiently high to provide hot water to the faucet 67 at all times. If the boiler water temperature should fall below 130° F., switch 78 will move to open circuit position thereby deenergizing pump motor 59 even though switch arm 89 is engaged with contact 92 by reason of the room thermostat calling for heat. In this manner, the boiler water cannot be circulated to the radiators if the temperature of the boiler water becomes too low.

It should be expressly understood that the invention is not limited to the use of a pump for controlling the circulation of the fluid medium to the radiators. Furthermore, the invention is not limited to any particular type of heating device nor is it limited to any particular type of furnace or boiler. In the examples herein disclosed, the boilers have both been shown as hot water boilers since these are the ones most generally used but it will be evident that types of furnaces other than those shown herein and steam boilers could replace the hot water boilers.

The pipe coil 64, while having been shown as located in the boiler water, may of course be located in other parts of the heater if desired. The thermostatic mixing valve 68 allows a variable amount of cold water to flow through pipe 70 to mix with the hot water drawn from the pipe coil 64 through pipe 69 so that the water issuing from faucet 67 will be maintained below some maximum temperature irrespective of the temperature of the water in the pipe coil 64. The use of a thermostatic mixing valve such as 68 is particularly beneficial if the pipe coil 64 is associated with a steam boiler or with some part of the furnace or heater resulting in the temperature of the water in pipe coil 64 being so high as to present a danger of scalding the user.

From the foregoing description and explanation of the drawing, it will be apparent that the present invention provides a novel simplified system eliminating the use of a hot water storage tank and one wherein a single heating device constantly maintains a supply of hot water available for domestic purposes and, in addition, serves to heat a room or space which it is desired to maintain at a constant temperature. The invention also provides a safety control whereby the boiler water is circulated to the heating radiators even when the space temperature is at or above that desired in the event the boiler water temperature becomes excessive and dangerous. The invention also provides mechanism by which circulation of the boiler water to the heating radiators is prevented in the event the temperature of the boiler water becomes low enough to present a danger of not maintaining a supply of hot water for domestic purposes. The invention further provides automatic means for limiting the maximum temperature of the water supplied by the domestic water supply system.

It is to be understood that I contemplate using the necessary traps, etc., ordinarily used in the radiating systems of the type illustrated herein.

While specific embodiments of the invention have been disclosed herein, it should be understood that those skilled in the art may make many modifications and changes therein and I am therefore to be limited only by the scope of the appended claims.

I claim:

1. In a combined space heating and domestic hot water heating system including a heating fluid containing space, means for heating the fluid in said heating fluid space, hot water heating means in continual heat exchange relationship with the heated heating fluid for supplying at all times hot water for domestic purposes, means for conducting the heating fluid from the heating fluid space to the space to be heated for heating the same, the combination of means for controlling circulation of the heating fluid through said conducting means, means subject to the temperature in the space to be heated for actuating said controlling means to cause the delivery of heating fluid through the conducting means to the space to be heated when the temperature therein is below a predetermined value, and means subject to a condition in said heating fluid containing space affected by heating of the heating fluid for preventing actuation of said controlling means when said condition is below the value at which the domestic water will be heated sufficiently for said domestic purposes although the condition of said heating fluid is such as to be of utility in heating the space to be heated.

2. In a combined space heating and domestic hot water heating system including a heating fluid containing space, means for heating the fluid in said heating fluid space, hot water heating means in continual heat exchange relationship with the heated heating fluid for supplying at all times hot water for domestic purposes, means for conducting the heating fluid from the heating fluid space to the space to be heated for heating the same, the combination of means for controlling circulation of the heating fluid through said conducting means, means subject to the temperature in the space to be heated for actuating said controlling means to cause the delivery of heating fluid through the conducting means to the space to be heated when the temperature therein is below a predetermined value, means subject to a condition in said heating fluid containing space affected by heating of the heating fluid for actuating said controlling means to cause delivery of heating fluid to said space to be heated when said condition is above a predetermined value, and means for operating the heating means when said condition is below a predetermined value.

3. In a combined space heating and domestic hot water heating system including a heating fluid containing space, means for heating the fluid in said heating fluid space, hot water heating means in continual heat exchange relationship with the heated heating fluid for supplying at all times hot water for domestic purposes, means for conducting the heating fluid from the heating fluid space to the space to be heated for heating the same, the combination of means for controlling circulation of the heating fluid through said conducting means, means subject to the temperature in the space to be heated for actuating said controlling means to cause the delivery of heating fluid through the conducting means to the space to be heated when the temperature therein is below a predetermined value, means subject to a condition in said heating fluid containing space affected by heating of the heating fluid for actuating said controlling means to cause delivery of heating fluid to said space to be heated when said condition is above a predetermined value, and means subject to said condition for preventing delivery of the heating fluid to the space to be heated when the condition is below a predetermined value.

4. In a combined space heating and domestic hot water heating system including a heating fluid containing space, means for heating the fluid in said heating fluid space, hot water heating means in continual heat exchange relationship with the heated heating fluid for supplying at all times hot water for domestic purposes, means for conducting the heating fluid from the heating fluid space to the space to be heated for heating the same, the combination of means for controlling circulation of the heating fluid through said conducting means, means subject to the temperature in the space to be heated for actuating said controlling means to cause the delivery of heating fluid through the conducting means to the space to be heated when the temperature therein is below a predetermined value, means subject to a condition in said heating fluid containing space affected by heating of the heating fluid for preventing actuation of said controlling means when the condition is below a predetermined value, and means subject to said condition for operating the heating means when said condition is below a predetermined value.

5. In a combined space heating and domestic hot water heating system including a heating fluid containing space, means for heating the fluid in said heating fluid space, hot water heating means in continual heat exchange relationship with the heated heating fluid for supplying at all times hot water for domestic purposes, means for conducting the heating fluid from the heating fluid space to the space to be heated for heating the same, the combination of means for controlling circulation of the heating fluid through said conducting means, means subject to the temperature in the space to be heated for actuating said controlling means to cause the delivery of heating fluid through the conducting means to the space to be heated when the temperature therein is below a predetermined value, means subject to a condition in said heating fluid containing space affected by heating of the heating fluid for actuating said controlling means to cause delivery of heating fluid to said space to be heated when said condition is above a predetermined value, means subject to said condition for preventing delivery of the heating fluid to the space to be heated when the condition is below a predetermined value, and means subject to the condition for operating the heating means when the condition is below a predetermined value.

6. In a combined space heating and domestic hot water heating system including a heating fluid containing space, means for heating the fluid in said heating fluid space, hot water heating means in continual heat exchange relationship with the heated heating fluid for supplying at all times hot water for domestic purposes, means for conducting the heating fluid from the heating fluid space to the space to be heated for heating the same, the combination of means for controlling circulation of the heating fluid through said conducting means, means subject to the temperature of the space to be heated for operating said heating means to cause heating of the heating fluid and also for actuating said controlling means to cause delivery of heating fluid to said space to be heated when the temperature therein is below a predetermined value, and means subject to a condition in said heating fluid containing space affected by the heating of the heating fluid for actuating said controlling means to cause delivery of heating fluid to said space to be heated when said condition is above a predetermined value.

7. In a combined space heating and domestic hot water heating system including a heating fluid containing space, means for heating the fluid in said heating fluid space, hot water heating means in continual heat exchange relationship with the heated heating fluid for supplying at all times hot water for domestic purposes, means for conducting the heating fluid from the heating fluid space to the space to be heated for heating the same, the combination of means for controlling circulation of the heating fluid through said conducting means, means subject to the temperature of the space to be heated for operating said heating means to cause heating of the heating fluid and also for actuating said controlling means to cause delivery of heating fluid to said space to be heated when the temperature therein is below a predetermined value, and means subject to a condition in said heating fluid containing space affected by heating of the heating fluid for preventing actuation of said controlling means when said condition is below the value at which the domestic water will be heated sufficiently for normal domestic purposes while said heating fluid is of such value as to have utility for heating said space to be heated.

8. In a combined space heating and domestic hot water heating system including a heating fluid containing space, means for heating the fluid in said heating fluid space, hot water heating means in continual heat exchange relationship with the heated heating fluid for supplying at all times hot water for domestic purposes, means for conducting the heating fluid from the heating fluid space to the space to be heated for heating the same, the combination of means for controlling circulation of the heating fluid through said conducting means, means subject to the temperature of the space to be heated for operating said heating means to cause heating of the heating fluid and also for actuating said controlling means to cause delivery of heating fluid to said space to be heated when the temperature therein is below a predetermined value, means subject to a condition in said heating fluid containing space affected by the heating of the heating fluid for actuating said controlling means to cause delivery of the heating fluid to said space to be heated when said condition is above a predetermined value, and means subject to said condition for operating the heating means when the condition is below a predetermined value.

9. In a combined space heating and domestic hot water heating system including a heating fluid containing space, means for heating the fluid in said heating fluid space, hot water heating means in continual heat exchange relationship with the heated heating fluid for supplying at all times hot water for domestic purposes, means for conducting the heating fluid from the heating fluid space to the space to be heated for heating the same, the combination of means for controlling circulation of the heating fluid through said conducting means, means subject to the temperature of the space to be heated for operating said heating means to cause heating of the heating fluid and also for actuating said controlling means to cause delivery of heating fluid to said space to be heated when the temperature therein is below a predetermined value, means subject to a condition in said heating fluid containing space affected by heating of the heating fluid for actuating said controlling means to cause delivery of the heating fluid to said space to be heated when said condition is above a predetermined value, and means subject to said condition for preventing delivery of heating fluid to said space to be heated when the condition is below a predetermined value.

10. In a combined space heating and domestic hot water heating system including a heating fluid containing space, means for heating the fluid in said heating fluid space, hot water heating means in continual heat exchange relationship with the heated heating fluid for supplying at all times hot water for domestic purposes, means for conducting the heating fluid from the heating fluid space to the space to be heated for heating the same, the combination of means for controlling circulation of the heating fluid through said conducting means, means subject to the temperature of the space to be heated for operating said heating means to cause heating of the heating fluid and also for actuating said controlling means to cause delivery of heating fluid to said space to be heated when the temperature therein is below a predetermined value, means subject to a condition in said heating fluid containing space affected by heating of the heating fluid for actuating said controlling means to cause delivery of the heating fluid to said space to be heated when said condition is above a predetermined value, means subject to said condition for preventing delivery of heating fluid to said space to be heated when the condition is below a predetermined value, and means subject to said condition for operating the heating means when the condition is below a predetermined value.

11. In a combined space heating and domestic hot water heating system including a heating fluid containing space, means for heating the fluid in said heating fluid space, hot water heating means in continual heat exchange relationship with the heated heating fluid for supplying at all times hot water for domestic purposes, means for conducting the heating fluid from the heating fluid space to the space to be heated for heating the same, the combination of means for controlling circulation of the heating fluid through said conducting means, means subject to the temperature of the space to be heated for operating said heating means to cause heating of the heating fluid and also for actuating said controlling means to cause delivery of heating fluid to said space to be heated when the temperature therein is below a predetermined value, means subject to a condition in said heating fluid containing space affected by heating of the heating fluid for preventing actuation of said controlling means when said condition is below a predetermined value, and means subject to said condition for operating the heating means when the condition is below a predetermined value.

12. In a hot water heating system having a boiler, a heat exchanger and connections between the boiler and heat exchanger, the combination of a combustion device for the boiler, a circulator for circulating hot water through the connections, a room thermostat arranged to start and stop operation of the combustion device and circulator simultaneously, and control means responsive to boiler water temperature to start and stop operation of the combustion device independently of said room thermostat and circulator and to start and stop operation of the circulator independently of said room thermostat and combustion device.

13. In a hot water heating system having a boiler, a heat exchanger and connections between the boiler and heat exchanger, the combination of a combustion device for the boiler, a circulator for circulating hot water through the connections, a room thermostat arranged to start and stop operation of the combustion device and circulator simultaneously, and control means responsive to boiler water temperature to start and stop operation of the combustion device independently of said room thermostat and circulator and to start and stop operation of the circulator independently of the combustion device when the room thermostat is causing operation of the combustion device.

14. In a hot water heating system having a boiler, a heat exchanger and connections between the boiler and heat exchanger, the combination of a combustion device for the boiler, a circulator for circulating hot water through the connections, a room thermostat arranged to start and stop operation of the combustion device and circulator simultaneously, and control means responsive to boiler water temperature to start and stop operation of the combustion device independently of said room thermostat and circulator, to start and stop operation of the circulator independently of said room thermostat and combustion device and to start and stop operation of the circulator independently of the combustion device when the room thermostat is causing operation of the combustion device.

WAYLAND R. MILLER.